United States Patent [19]
De Garmo

[11] 3,816,716
[45] June 11, 1974

[54] NAVIGATIONAL COMPUTER
[76] Inventor: Ray G. De Garmo, 235 S. Grape, Denver, Colo. 80222
[22] Filed: Jan. 4, 1973
[21] Appl. No.: 320,922

[52] U.S. Cl............................. 235/150.2, 244/77 R
[51] Int. Cl........................................... G06f 15/50
[58] Field of Search.................... 235/150.2, 150.26; 244/77 R

[56] References Cited
UNITED STATES PATENTS
3,443,073   5/1969   Cohen............................. 235/150.2
3,649,818   3/1972   Sylvander et al. ........... 235/150.2 X Primary Examiner—Malcolm A. Morrison
Assistant Examiner—R. Stephen Dildine, Jr.
Attorney, Agent, or Firm—Burton, Crandell, Polumbus & Harris

[57] ABSTRACT

A navigational computer that employs displays and registers to place in and retain the estimated ground speed, the time of day, and the distance of the leg of the flight. An arithmetic unit accepts such information and calculates the estimated time of arrival, the actual ground speed, and the distance remaining in the present leg of the flight. Three readout displays provide such data to the pilot.

7 Claims, 2 Drawing Figures

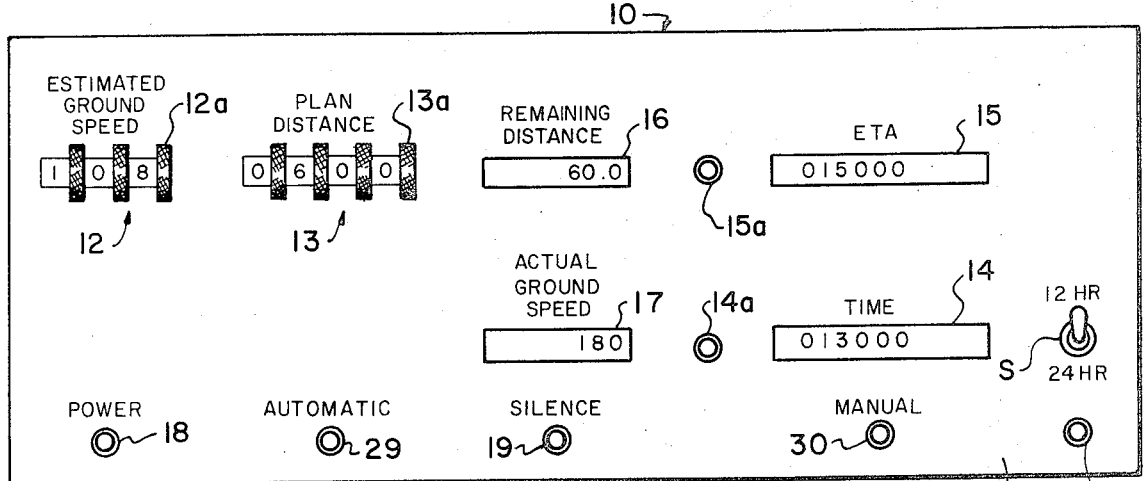
Fig_1
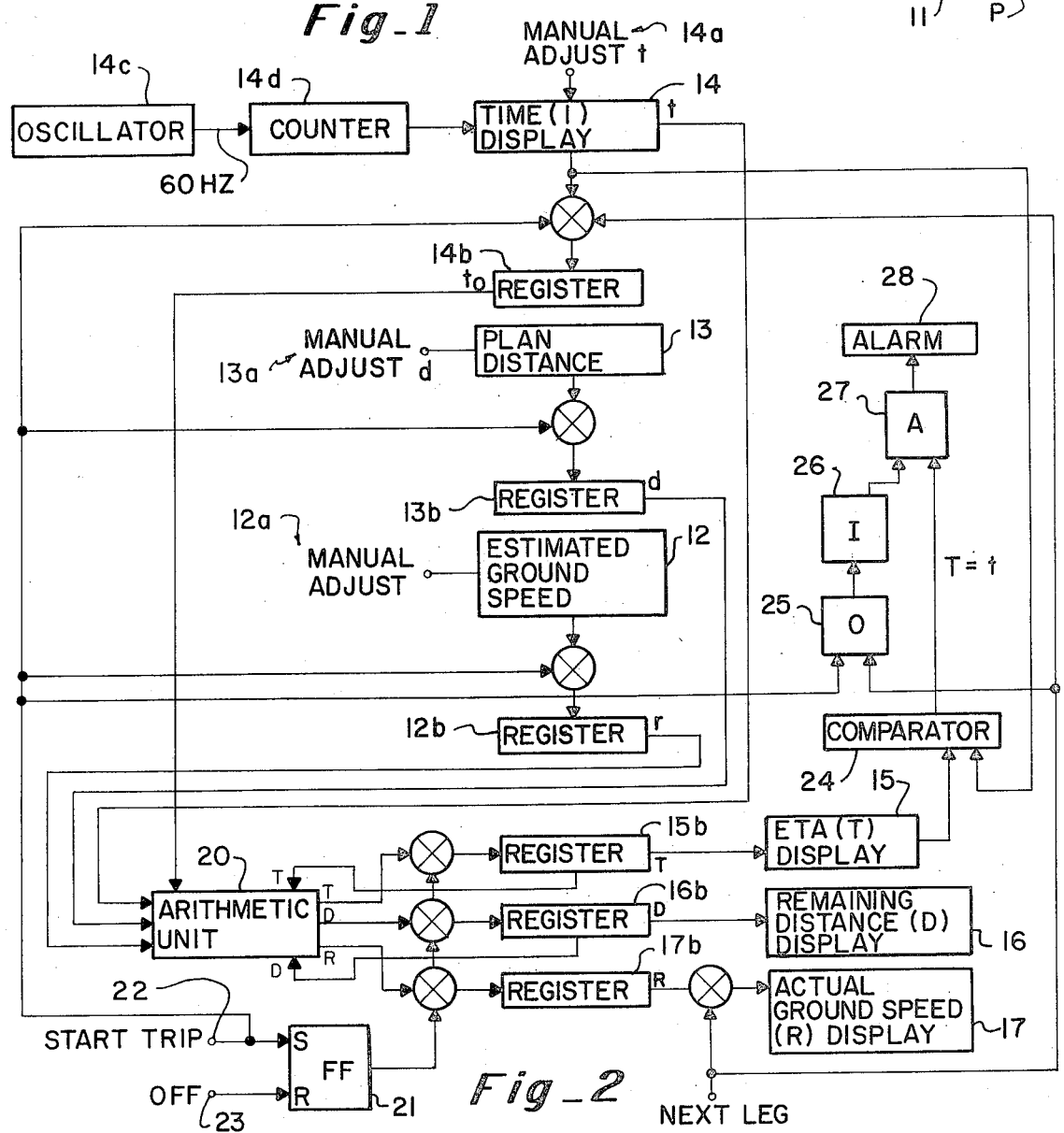
Fig_2

NAVIGATIONAL COMPUTER

FIELD OF THE INVENTION

This invention relates to navigation aids for aircraft pilots and more particularly to a novel navigational computer for displaying the estimated time of arrival, the distance remaining, and the actual ground speed of the aircraft.

DESCRIPTION OF THE PRIOR ART

In this day and age, a pilot of an aircraft must constantly be aware of the air traffic in his general area. With the number of planes increasing every year and the average speed of aircraft increasing also, the pilot must check the surrounding space more frequently. In the past, pilots could take more time to obtain desired data, such as estimated time of arrival, by operating hand calculators. However, operation of such hand calculators necessitates that the pilot must look at the hand calculator for a period of time that might prove to be endangering to his life, particularly in proximity of a busy airport or busy checkpoint.

Accordingly, it is an object of the present invention to provide a navigational computer which may be quickly set and activated.

It is a further object of the present invention to provide a navigational computer that is relatively simple to operate.

It is a still further object of the present invention to provide a navigational computer that displays a plurality of visual readouts and audio indication of desired data.

It is another object of the present invention to provide navigational a navagational computer that displays the estimated time of arrival, the actual ground speed, and the distance remaining in the present leg of the flight and also an alarm that is activated when the estimated time of arrival equals the time of day.

SUMMARY OF THE INVENTION

In accordance with the objects set forth above, the present invention provides a navigational computer that employs displays and registers to place in and retain the estimated ground speed, the time of day, and the distance of the leg of the flight. An arithmetic unit accepts such information and calculates the estimated time of arrival, the actual ground speed, and the distance remaining in the present leg of the flight. Such data is then provided on three respective displays.

BRIEF DESCRIPTION OF THE DRAWINGS

Additional objects, advantages, and characteristics of the present invention will become readily apparent from the following detailed description of preferred embodiments of the invention when taken in conjunction with the accompanying drawings in which:

FIG. 1 is an elevational view of the front panel of the navigation computer in accordance with the present invention; and FIG. 2 is a simplified block diagram of the navigation computer in accordance with the present invention.

DESCRIPTION OF THE PREFERRED EMBODIMENTS

Referring now to FIG. 1, there is shown an elevational view of the front panel 11 of the navigational computer 10 in accordance with the present invention.

On the left side of front panel 11, there are two indicators which display the estimated ground speed and the plan distance of the present leg of the flight. The indicators 12 and 13, respectively, display such estimated ground speed and such distance. The thumbwheels 12a and 13a allow the pilot to dial conveniently such information to indicators 12 and 13. On the right side of front panel 11, there is a 6 digit time display 14 which displays the time of day. The correct time of day may be set by dialing the time of day into indicators 12 and 13, indicator 13 receiving the three highest order of digits. The button 14a is then actuated. Immediately above the time display 14 is a 6 digit estimated time of arrival (ETA) display 15. In the center of the front panel 11, there are two displays, the remaining distance display 16 and the actual ground speed display 17. Further illustrated are a power-on switch 18, a silence button 19, an automatic button 20, a manual button 30, and push button 15a for the estimated time of arrival display 15. The use and function of such controls will be discussed later in the specification during the discussion of the operation of the navigational computer 10.

In FIG. 1 is also shown a clock-selector switch S for selecting either a 12-hour or 24-hour clock. Normally, the 12-hour clock setting will be used for local time and the 24-hour clock setting will be used for Greenwich mean time (ZULU). A push button P can be depressed to reset the computer such that all indicators, except the time of day indicator, will be blank or show zero.

Referring now to FIG. 2, there is shown a simplified block diagram of the navigational computer 10 in accordance with the present invention. The various functions of the various elements of the navigational computer 10, for example, the arithmetic unit 20 and other illustrated units, may be performed either electronically, mechanically, and/or hydraulically. The arithmetic unit 20 may be an electronic digital or analogue calculator or an adjustable series of mechanical gears or cams.

The registers 12b, 13b and 14b respectively retain the estimated ground speed, the plan distance, and the actual time of day. The oscillator 14c and the couner 14d are conventional means for providing a correct computation of the time of day. The data as to the time of departure (to), to the time of day ($t$), the estimated ground speed ($r$), and the plan distance ($d$) are fed to the arithmetic unit 20 as illustrated. The arithmetic unit 20 will then calculate the estimated time of arrival (T), the remaining distance (D), and the actual ground speed (R). Such respective outputs of the arithmetic unit 20 will be fed to the respective registers 15b, 16b and 17b. The respective outputs T, D, and R will be displayed on the estimated time of arrival display 15, the remaining distance display 16, and the actual ground speed display 17, respectively.

Further illustrated is circuitry for starting computations, namely, the flip-flop 21 and its associated start trip switch 22 and off switch 23. On the right side of FIG. 2, there is illustrated circuitry for comparing the estimated time of arrival (T) with the time of day ($t$). Such circuitry includes a comparator 24, an "or" gate 25, an invertor 26, an "and" gate 27, and an alarm 28. The alarm 28 will sound when the estimated time of arrival (T) equals the time of day ($t$).

OPERATION

In utilizing the navigational computer 10 during a typical flight, the pilot may take the following steps to ensure the display of the desired data:

1. Set the time of day ($t$).
   a. Dial the time of day ($t$) into the indicators 12 and 13, indicator 13 receiving the three highest order of digits and then depress the push button 14a, which upon release, the display 14 will begin to increment seconds, minutes and hours.
2. Initiate the first leg of the flight.
   a. Dial the estimated speed ($r$) into the three digits of the indicator 12 by means of the thumbwheel switches 12a.
   b. Dial the distance ($d$) of the first leg of the flight into the right digits of the indicator 13 by means of the thumbwheel switches 13a.
   c. Depress the "MANUAL" pushbutton 30 when the flight begins. When the pushbutton 30 is released, the navigational computer 10 will display the distance ($d$) and speed ($r$) as dialed. Furthermore, the navigational computer 10 will also compute and display the estimated time of arrival (T) at the first checkpoint. The computation for ETA (T) is as follows:
   $n$ = numbers of seconds to traverse the distance ($d$) at a speed ($r$).
   $d$ may be either statute or nautical miles.
   $r$ will be miles per hour or knots to correspond with ($d$).
   $n = 3,600\ (d)/r$
   $n$ is converted to hours, minutes and seconds and added to the time of departure (to) to obtain the estimated time of arrival (T).
3. Set up the next leg of the flight.
   a. Dial the distance of the second leg of the flight ($d_2$) into the three right digits of the indicator 13 by means of the thumbwheel switches 13a. Such dialing may be done at any time prior to arriving at the first checkpoint.
4. Expired first leg alarm.
   a. The actual speed for the first leg of the flight may not be estimated. Should the time for the first leg expire (T = ETA), the alarm 28 will sound to alert the pilot that he should have arrived. Th alarm may be stopped by depressing the silence pushbutton 19.
5. Initiate the second leg of the flight. Upon arrival at the first checkpoint, the pilot will depress the AUTOMATIC pushbutton 29 momentarily. When n the button is released the navigational computer 10 will proceed as follows:
   a. Compute the actual speed for the first leg (R) as follows:
   R = actual seconds to traverse the first leg.
   $R = 3,600\ (d\text{-}D)/(t\text{-}to)$
   b. Display the distance for the second leg ($d_2$) on the indicator 13.
   c. Display the actual speed for the first leg (R) as the speed for the second leg ($r_2$).
   d. Compute and display the ETA ($T_2$) for second checkpoint. This computation is performed as described above for the first leg of the flight using ($d_2$) and ($r_2$) in place of ($d$) and ($r$).
   e. The distance display 16 will begin to decrement per a new set of parameters.
6. Successive legs. All successive legs will be a repeat of the second leg of the flight. The actual speed for the previous leg will be used to project a new ETA (T) and a new distance (D).
7. Timed approach. While making timed approaches a pilot may dial in the estimated speed ($r$) and the distance ($d$) from the final fix to the runway. The pilot will depress the "MANUAL" pushbutton 30 when over the final fix. The alarm 28 will sound when the plane should be over the runway.
8. Expect further clearance. While in a holding pattern, the pilot may dial in the time (T) when he should expect further clearance. By depressing the pushbutton 15a next to the ETA display 15, the dialed time will be displayed. When the time of day ($t$) equals the time displayed T in the ETA display 15, the alarm 28 will sound.

Thus, although the present invention has been shown and described with reference to particular embodiments, for example, alarm means providing an audio output, nevertheless, various changes and modifications obvious to a person skilled in the art to which the invention pertains, for example, alarm means providing a flashing light and that display 14 may begin to increment upon depressing button 14a rather than upon release thereof, are deemed to lie with the spirit, scope, and contemplation of the invention as set forth in the appended claims.

I claim:
1. A navigational computer in an airplane for aiding the pilot in flight comprising:
   a plurality of indicators for displaying first indicia;
   a respective plurality of controls for inserting said first indicia in said respective plurality of indicators for receiving and retaining said first indicia;
   a respective plurality of registers;
   calculating means coupled to said respective plurality of registers and one of said plurality of indicators for receiving and utilizing said first indicia to provide second indicia;
   a second plurality of registers coupled to said calculating means for receiving, retaining and transferring said second indicia; and
   a plurality of displays coupled to said second plurality of registers for receiving and displaying said second indicia.
2. A navigational computer as recited in claim 1 wherein:
   said first indicia includes the time of day, the starting time of the leg of the flight, the estimated ground speed, and the distance of a leg of the flight; and said second indicia includes the estimated time of arrival, the actual ground speed, and the distance remaining in said leg of the flight.
3. A navigational computer as recited in claim 1 wherein:
   said plurality of indicators comprises respective indicators for respectively displaying the time of day, the estimated ground speed, and the distance of a leg of the flight; and
   said plurality of displays comprises respective displays for respectively displaying the estimated time of arrival, the actual ground speed, and the distance remaining in said leg of the flight.
4. A navigational computer as recited in claim 3 wherein said calculating means;

receives the starting time of the leg of the flight, the estimated ground speed and the distance of a leg of the flight from said first plurality of registers;

receives the time of day from said time of day indicator; and receives the estimated time of arrival and the remaining distance in said leg of the flight from said second plurality of registers.

5. A navigational computer as recited in claim 2 which further comprises:

a comparator and logic network means for comprising the time of day with the estimated time of arrival; and alarm means coupled to said comparator and logic network means for receiving a signal when the time of day equals the estimated time of arrival, said signal activating said alarm means to provide an audio output.

6. A navigational computer as recited in claim 5 which further includes control means for dialing the estimated time of arrival into an estimated time of arrival display during holding patterns in order to receive an audio output from said alarm means at the time when the airplane should be over the runway.

7. A navigational computer as recited in claim 3 which further includes means for recieving, calculating and displaying additional first and second indicia upon successive legs of said flight.

* * * * *

UNITED STATES PATENT OFFICE
CERTIFICATE OF CORRECTION

Patent No. 3,816,716        Dated June 11, 1974

Inventor(s) Ray G. DeGarmo

It is certified that error appears in the above-identified patent and that said Letters Patent are hereby corrected as shown below:

Column 1, Line 34, delete "navigational" (first occurrence)

Column 3, Line 46, "Th" should read --The--

Column 3, Line 52, delete "n"

Column 5, Line 11, "compris-" should read --compar---

Column 6, Line 11, "recieving" should read --receiving--

Signed and sealed this 7th day of January 1975.

(SEAL)
Attest:

McCOY M. GIBSON JR.
Attesting Officer

C. MARSHALL DANN
Commissioner of Patents